US007194161B1

(12) United States Patent
Deri et al.

(10) Patent No.: US 7,194,161 B1
(45) Date of Patent: Mar. 20, 2007

(54) WAVELENGTH-CONSERVING GRATING ROUTER FOR INTERMEDIATE WAVELENGTH DENSITY

(75) Inventors: Robert J. Deri, Pleasanton, CA (US); Rajesh R. Patel, Pleasanton, CA (US); Steven W. Bond, Livermore, CA (US); Cory V. Bennett, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 1040 days.

(21) Appl. No.: 09/609,178

(22) Filed: Jun. 30, 2000

Related U.S. Application Data

(60) Provisional application No. 60/141,899, filed on Jun. 30, 1999.

(51) Int. Cl.
*G02B 6/34* (2006.01)
(52) U.S. Cl. ............................. 385/37; 385/24; 385/31
(58) Field of Classification Search ................. 385/24, 385/31, 37
See application file for complete search history.

(56) References Cited

U.S. PATENT DOCUMENTS

| | | | | |
|---|---|---|---|---|
| 5,043,975 A * | 8/1991 | McMahon | .................... | 398/58 |
| 5,208,692 A * | 5/1993 | McMahon | .................... | 359/128 |
| 5,719,976 A | 2/1998 | Henry et al. | .................... | 385/50 |
| 5,721,796 A | 2/1998 | de Barros et al. | ............. | 385/37 |
| 5,742,414 A | 4/1998 | Frigo et al. | .................. | 359/125 |
| 5,745,612 A | 4/1998 | Wang et al. | .................... | 385/24 |
| 5,805,759 A * | 9/1998 | Fukushima | .................. | 385/140 |
| 5,867,291 A | 2/1999 | Wu et al. | ..................... | 359/124 |
| 6,088,496 A * | 7/2000 | Asghari | ........................ | 385/37 |
| 6,226,428 B1 * | 5/2001 | Saito et al. | .................... | 385/42 |
| 6,243,178 B1 * | 6/2001 | Suemura et al. | ............ | 359/128 |

OTHER PUBLICATIONS

A.M. Hill et al., IEEE Photonics Technology Letters, vol. 8, No. 4, Apr. 1996, pp. 569-571.
J.P. Laude et al., ECOC 97, Sep. 22-25, 1997, Conference Publication No. 448, 1997, pp. 87-90.
E.G. Churin et al., IEEE Photonics Technology Letters, vol. 11, No. 2, Feb. 1999, pp. 221-223.
E.G. Churin et al., Electronics Letters, Jun. 11th, 1998, vol. 34, No. 12, pp. 1225-1227.

* cited by examiner

*Primary Examiner*—Kevin S. Wood
(74) *Attorney, Agent, or Firm*—Michael C. Staggs; L. E. Carnahan; John H. Lee

(57) ABSTRACT

A wavelength router to be used for fiber optical networking router is based on a diffraction grating which utilizes only N wavelengths to interconnect N inputs to N outputs. The basic approach is to augment the grating with additional couplers or wavelength selective elements so than N−1 of the 2N−1 outputs are combined with other N outputs (leaving only N outputs). One embodiment uses directional couplers as combiners. Another embodiment uses wavelength-selective couplers. Another embodiment uses a pair of diffraction gratings to maintain parallel propagation of all optical beams. Also, beam combining can be implemented either by using retroflection back through the grating pair or by using couplers.

9 Claims, 5 Drawing Sheets

WAVELENGTH-CONSERVING GRATING ROUTER FOR INTERMEDIATE WAVELENGTH DENSITY

RELATED APPLICATION

This application relates to U.S. Provisional Application No. 60/141,899 filed Jun. 30, 1999, and claims priority thereof.

The United States Government has rights in this invention pursuant to Contract No. W-7405-ENG48 between the United States Department of Energy and the University of California for the operation of Lawrence Livermore National Laboratory.

BACKGROUND OF THE INVENTION

The present invention relates to wavelength routers, particularly to a wavelength router for fiber optical networking and computer interconnects, and more particularly to a wavelength router based on a diffraction grating which utilizes only N wavelengths to interconnect N inputs to N outputs, and the grating may be combined with additional couplers or wavelength selective elements.

Wavelength division multiplexing (WDM) is becoming increasingly important as a means to increase the bandwidth available in fiber optic systems. These include telecommunications systems based on single-mode fiber, local area networks based on single strands of multimode fiber, and high performance computer interconnects based on parallel arrays of optical fiber. All these systems require wavelength multiplexers and routers to provide for independent transport of communications channels at different wavelengths. This has spawned a substantial industry in WDM components for telecommunications (currently several $100 Ms/year), which is expected to grow substantially within this market, and to extend beyond this market into local area networks based on the recent introduction of optical transport for gigabit ethernet.

All these systems can benefit substantially from a wavelength router, a device with N inputs and N outputs which routes light from a given input to an output which is determined by the wavelength of the light. The ideal device requires only N system wavelengths ($\lambda$). This is important because it minimizes system complexity, and minimizes the number of different laser transmitters which must be available to provision a system. The routing table for such a device may be as follows:

| | Output Ports: | | | | |
|---|---|---|---|---|---|
| | 1 | 2 | 3 | 4 | ... N |
| Input 1 | $\lambda 1$ | $\lambda 2$ | $\lambda 3$ | $\lambda 4$ ... | $\lambda N$ |
| 2 | $\lambda N$ | $\lambda 1$ | $\lambda 2$ | $\lambda 3$ ... | $\lambda N-1$ |
| 3 | $\lambda N-1$ | $\lambda N$ | $\lambda 1$ | $\lambda 2$ ... | $\lambda N-2$ |
| 4 | $\lambda N-2$ | $\lambda N-1$ | $\lambda N$ | $\lambda 1$ ... | $\lambda N-3$ |
| ... N | $\lambda 2$ | $\lambda 3$ | $\lambda 4$ | $\lambda 5$ ... | $\lambda 1$ | where $\lambda x$ indicates which wavelength x is used to connect a given input port to a given output. A key feature of the routing table is that it is fully non-blocking; that is, a connection between any input i and any output j can be established without disrupting or interfering with already existing connections.

A device called a waveguide grating router which provides this functionality is currently commercially available. It is a phased array operating in a high spectral order, and the 'wrap-around' (in which $\lambda N$ is directed back to port 1, etc.) is achieved by using multiple orders of the phased array. A similar approach could be achieved using a grating in high order. These devices must operate in high order to maintain a nearly constant dispersion across multiple orders. For example, a Littrow grating's dispersion (change in routed wavelength with output port position) is:

$$\frac{\Delta \lambda}{\Delta x} = Fp \frac{\cos \theta}{d}$$

Where F is the working distance, $\theta$ is the output angle relative to the grating, d is the grating tooth pitch, and p is the spectral order. For the dispersion at fixed output position ($\theta$) to be insensitive to order, p must be very large. Then $\approx p \pm 1$ and the dispersion is almost constant.

The fundamental problem with operating in high spectral order is that the free spectral range (total usable wavelength range) of the device is limited to $\lambda_o/p$, where $\lambda_o$ is the center of the operating wavelength range. For this reason, waveguide grating routers are only used for very dense WDM systems, in which wavelength channels are spaced very closely together. This is often undesirable, because it requires very accurate control of the operating wavelengths of all system components. If the wavelength channels are spaced far apart, only a few channels can be included in the system (which is undesirable).

A second problem with waveguide grating routers is that they are only available for single mode fiber optics. To achieve similar functionality for multimode fibers, one must use a conventional grating. However, it is difficult to obtain high-order gratings (echelles) that exhibit good diffraction efficiency at telecommunications wavelengths. As a result, grating-based wavelength routers typically either: 1) do not conserve wavelengths (they use many more wavelengths than N), 2) or they use more than N output ports, or 3) they require optoelectronic conversion. Each of these cases is discussed below.

Case 1. In general, a grating with N inputs, each supporting M wavelengths, generates M+N−1 output spots from a single diffraction order, where each spot is a unique output spatial position. To reduce the number of output spots to N (since there are only N output ports), one can employ more system wavelengths (2N−1). However, this increase in system wavelengths is undesirable for the reasons discussed above (increased system complexity and provisioning difficulty). An example of this approach is described in A. M. Hill et al., Photonics Technol. Lett. 8(4), 569 (1996), who uses 7 wavelengths for a 4×4 router (N=4). Another example is J. P. Laude et al., Proc. European Conf. Optical Commun. Vol. 3, pp. 87–90 (1997). "Very dense N×N wavelength routers based on a new diffraction grating configuration."

Case 2. One can use M+N−1 output ports. This is done in Churin and Bayvel, Photonics Technol. Letts. 11(2), 22 (1999). In which 90 inputs are connected to 179 outputs. Also see Churin et al., Electronics Letters 34(12), 1225 (1998). This is undesirable because, for only N wavelengths, certain inputs can never transmit to certain outputs. For the routing table described above, for example, input 2 could not transmit to output 1 (because $\lambda N$ doesn't wrap-around, instead it's routed to output N+1). This is highly undesirable because it reduces system connectivity. It can only be avoided by adding more system wavelengths, as in Case 1 above.

Case 3. Optoelectronic conversion. One can use a wavelength demultiplexer on each port to convert every wavelength into a separate electronic signal, and then use electronic wiring to route these signals to appropriate optical transmitters on different wavelengths, and then use a wavelength multiplexer to combine these signals onto the output fibers. This is done in U.S. Pat. No. 5,742,414, issued Apr. 21, 1998 to N. Frigo et al. The disadvantage is that it adds a lot of cost (the optoelectronic conversion devices, many WDM multiplexer units), and it prevents transparent data transport (the electronic routing will limit the data rate, and possibly data format).

There are also other routing devices which can be configured by cascading many 2×2 (2 input, 2 output) routing elements. These generally are expensive (many components, lots of assembly), and often are restricted to single-mode fiber operation. Examples include: U.S. Pat. No. 5,721,796 issued Feb. 24, 1998 to M. deBarros et al., and U.S. Pat. No. 5,719,976 issued Feb. 17, 1998 to C. H. Henry et al.

The wavelength routing device of the present invention is based on a diffraction grating which utilizes only N wavelengths to interconnect N inputs to N outputs in a fully non-blocking manner. The basic approach is to augment the grating with additional couplers or wavelength selective elements so that N−1 of the 2N−1 outputs are combined with the other N outputs (leaving only N outputs).

SUMMARY OF THE INVENTION

It is an object of the present invention to provide a wavelength router to be used for fiber optical networking and computer interconnects.

A further object of the invention is to provide a wavelength-conserving grating router for intermediate wavelength density.

Another object of the invention is to provide means for realizing a wavelength router based on a diffraction grating which utilizes only N wavelengths to interconnect N inputs to N outputs in a fully non-blocking manner.

Another object of the invention is to augment a wavelength grating router with additional couplers or wavelength selective elements so that N−1 of the 2N−1 outputs are combined with the other N outputs, leaving only N outputs and providing fully non-blocking inter-connection.

Another object of the invention is to provide a diffraction grating router in combination with directional couplers as combiners, wavelength-selective couplers (optical wavelength add-drop multiplexers), and with another diffraction grating.

Other objects and advantages of the present invention will become apparent from the following description and accompanying drawings. Basically, the present invention involves a wavelength router to be used for fiber optical networking and computer interconnects. More specifically the invention is directed to a wavelength conserving grating router for intermediate wavelength density. Specifically, the invention provides the means for realizing a wavelength router based on a diffraction grating which utilizes only N wavelengths to interconnect N inputs to N outputs in a fully non-blocking manner. The diffraction grating can be combined with directional couplers, wavelength-selective couplers, or another diffraction grating.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
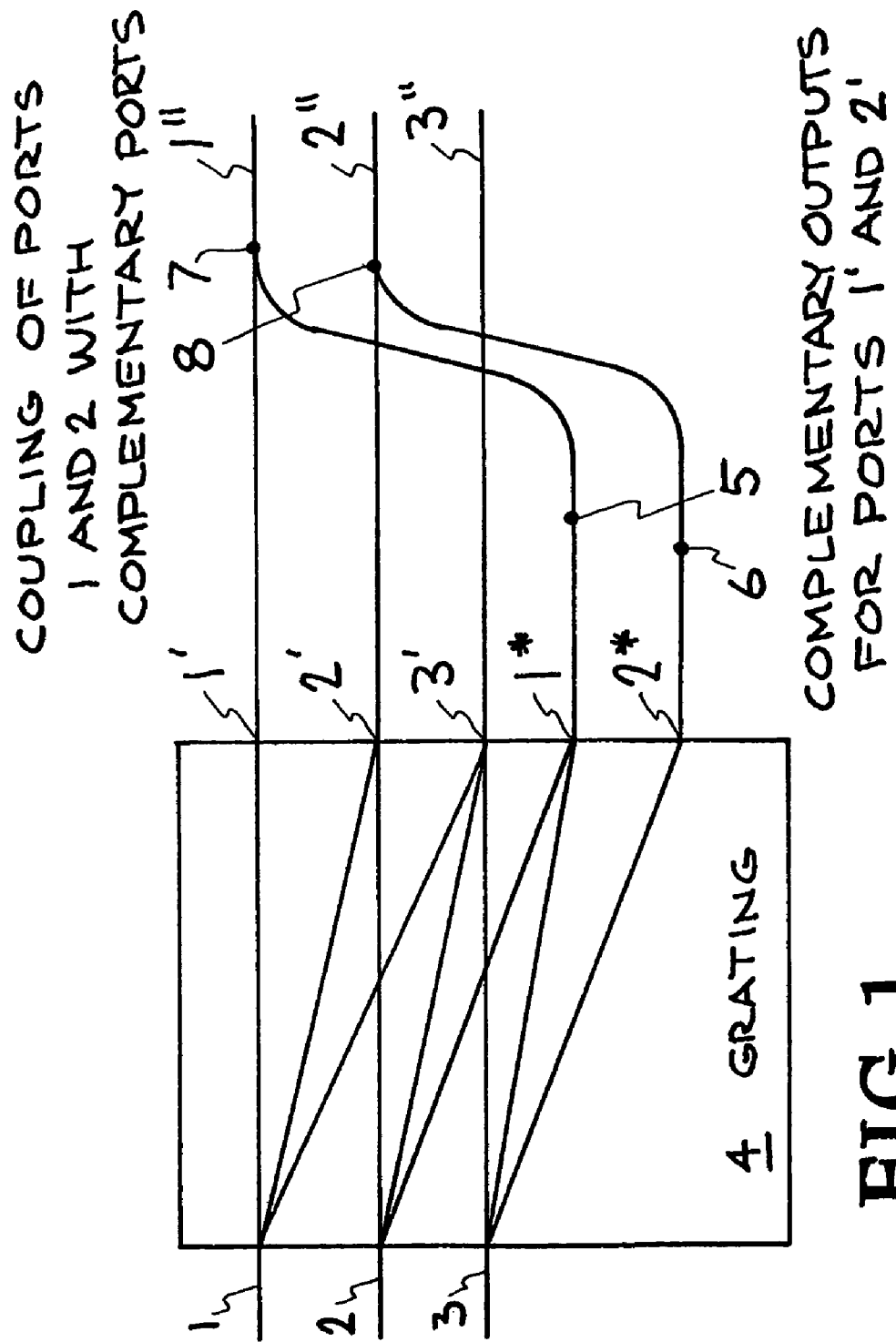
FIG. 1 conceptually illustrates a simple multi-mode grating router made in accordance with the present invention.

The present invention is directed to a wavelength-conserving grating router for intermediate wavelength density. The wavelength router of this invention can be used for fiber optical networking and computer interconnects. The wavelength router is based on a diffraction grating which utilizes only N wavelengths to interconnect N inputs to N outputs in a fully non-blocking manner. The basic diffraction grating router is augmented with additional couplers or wavelength-selective elements so that N−1 of the 2N−1 outputs are combined with the other N outputs (leaving only N outputs). This is shown conceptually by a simple multi-mode grating router of FIG. 1, wherein the inputs 1, 2, and 3 are spaced at various calculated angles on the grating 4, with different line styles through grating 4 distinguishing light from the different inputs 1–3. Output ports 1', 2', and 3' and corresponding outputs 1", 2", and 3" are each shown on a direct line with inputs 1, 2, and 3, respectively, via grating 4. Complimentary output ports 1* and 2* with outputs 5 and 6 for output ports 1' and 2' are located below output 3' in grating 4. The complimentary outputs 5 and 6 are combined or coupled with output 1" and 2" by couplers as indicated at 7 and 8. While only 3 channels are shown in FIG. 1 for simplicity of illustration, the approach is valid for N channels (where N is any number).

The diffraction grating router is described hereinafter in three different embodiments: 1) with directional couplers as combiners, 2) with wavelength-selective couplers, and 3) using a pair of diffraction gratings and other coupling optics.

The first embodiment, with directional couplers as combiners, is somewhat undesirable because it introduces an excess 3 dB insertion loss. The second embodiment, with wavelength-selective couplers, which may be optical wavelength add-drop multiplexers, can eliminate the excess insertion loss of the first embodiment. The optical wavelength add-drop multiplexers may be of the type described and claimed in copending U.S. application Ser. No. 09/281,742 filed Mar. 30, 1999, entitled "Optical Add/Drop Filter For Wavelength Division Multiplexed Systems," assigned to the same assignee.

The third embodiment, using a pair of diffraction gratings, can maintain parallel propagation of all optical beams. This should improve insertion loss. Beam combining can be implemented either by using retroflection back through the grating pair as illustrated in FIG. 2 and described hereinafter, or by using couplers as in FIG. 1 as illustrated in FIG. 3 and described hereinafter.

Figure 2:
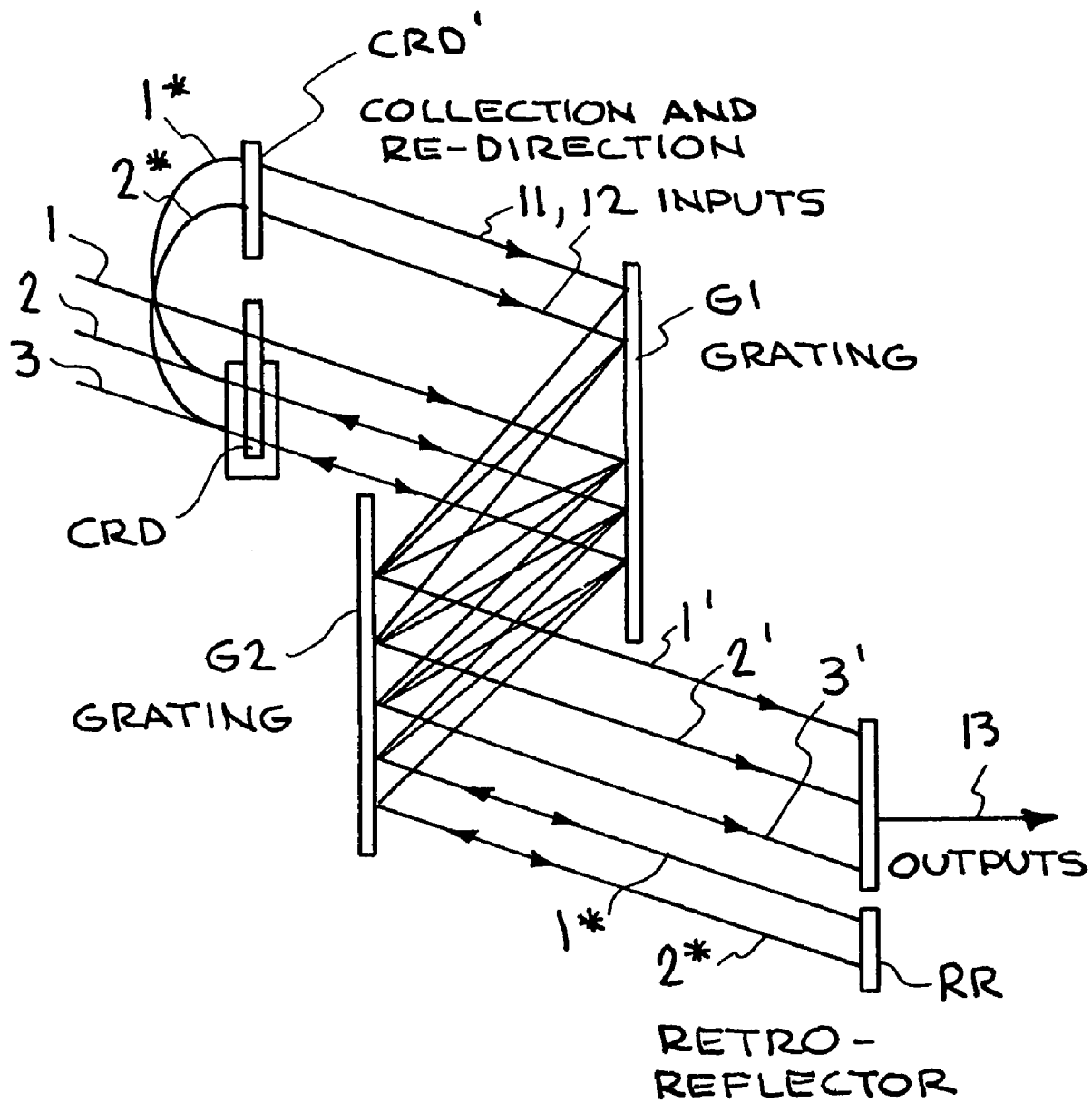
FIG. 2 schematically illustrates a grating pair wavelength division multiplexing router incorporating a retroreflector and collection optics in accordance with the invention.

The embodiment of FIG. 2 comprises a collection and redirection optic assembly CRD, a pair of diffraction gratings G1 and G2, and a retroreflector assembly RR (which can veritically displace and retro-reflect n−1 beams). The CRD functions to collect and re-direct the n−1 beams from the RR back through the gratings G1 and G2. As shown in FIG. 2, inputs 1, 2, and 3 are incident onto gratings G1 and G2 producing outputs 1', 2', and 3', shown by arrow 13 as combined outputs, and complimentary outputs 1* and 2*, as indicated by the arrows. Outputs 1* and 2* are reflected by the RR back through gratings G1 and G2 to the CRD, as shown by the double arrows, and are redirected by the CRD, as indicated at 11 and 12 onto gratings G1 and G2. The CRD is placed such that the optical beams are properly routed back through the gratings G1 and G2 onto the outputs 1' and 2' to complete the routing of all output channels.

As seen in FIG. 2 CRD' is the same component as the CRD but is illustrated only to illustrate the reduction of outputs 1* and 2* after being reflected back through the gratings by the RR.

Figure 3:
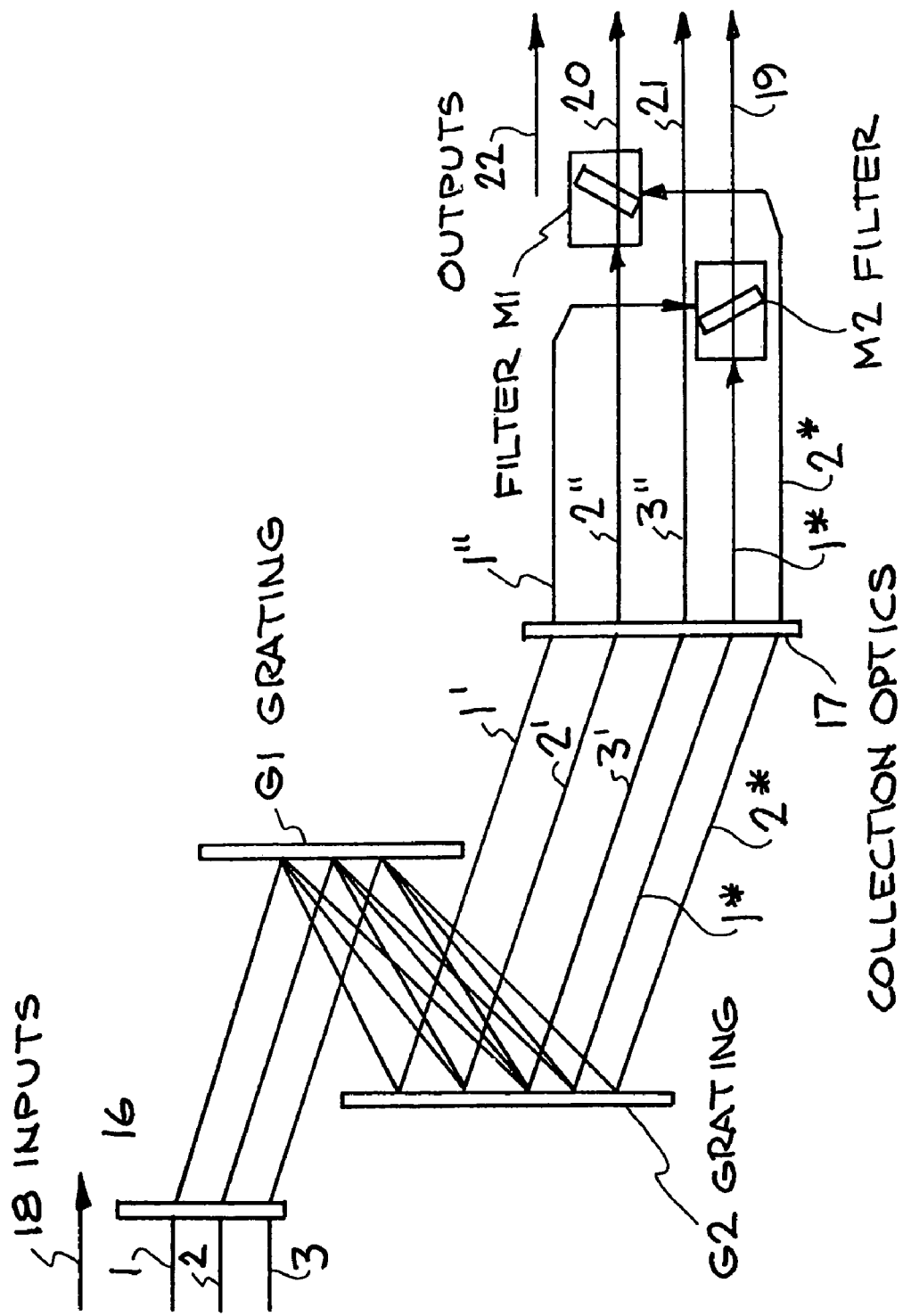
FIG. 3 schematically illustrates a grating pair wavelength division multiplexing router using 3-port filters (which may be wavelength selective couplers or directional couplers).

The embodiment of FIG. 3 comprises an input optic 16, identical diffraction gratings G1 and G2, collection optic assembly 17, and two wavelength-selective add/drop (3-port) filter modules M1 and M2, with the filters of each module being different. Inputs 1, 2, and 3 are directed as indicated by arrow 18 through optic 16 onto grating G1 and to grating G2 with outputs from grating G2 indicated at 1', 2', 3', 1*, and 2* and which are directed through collecting optic assembly 17 whereafter outputs 1" and 1* are directed into M2 having an output 19, outputs 2" and 2* are directed into M1 having an output 20, and output 3" becomes output 21 as indicated by arrow 22. For N channels, N−1 different filters are required for N×N fully non-blocking interconnection.

A prototype of an embodiment of the invention was experimentally demonstrated using a 400 lines/mm grating operated in a Littrow configuration with single-strand, multi-mode fiber inputs housed in an MT ferrule array connector. The grating approach of FIG. 1 was implemented using wavelength-selective add-drop filters, such as in above-referenced application Ser. No. 09/281,742, for the couplers.

The experimental demonstration was carried out using a blazed diffraction grating with 37 nm channel spacing and 6 nm FWHM in the 800–900 nm range for WDM over multi-mode fiber. Broadband thin-film add/drop filters provided wavelength re-use enabling N×N fully non-blocking interconnection with N wavelengths.

Figure 4:
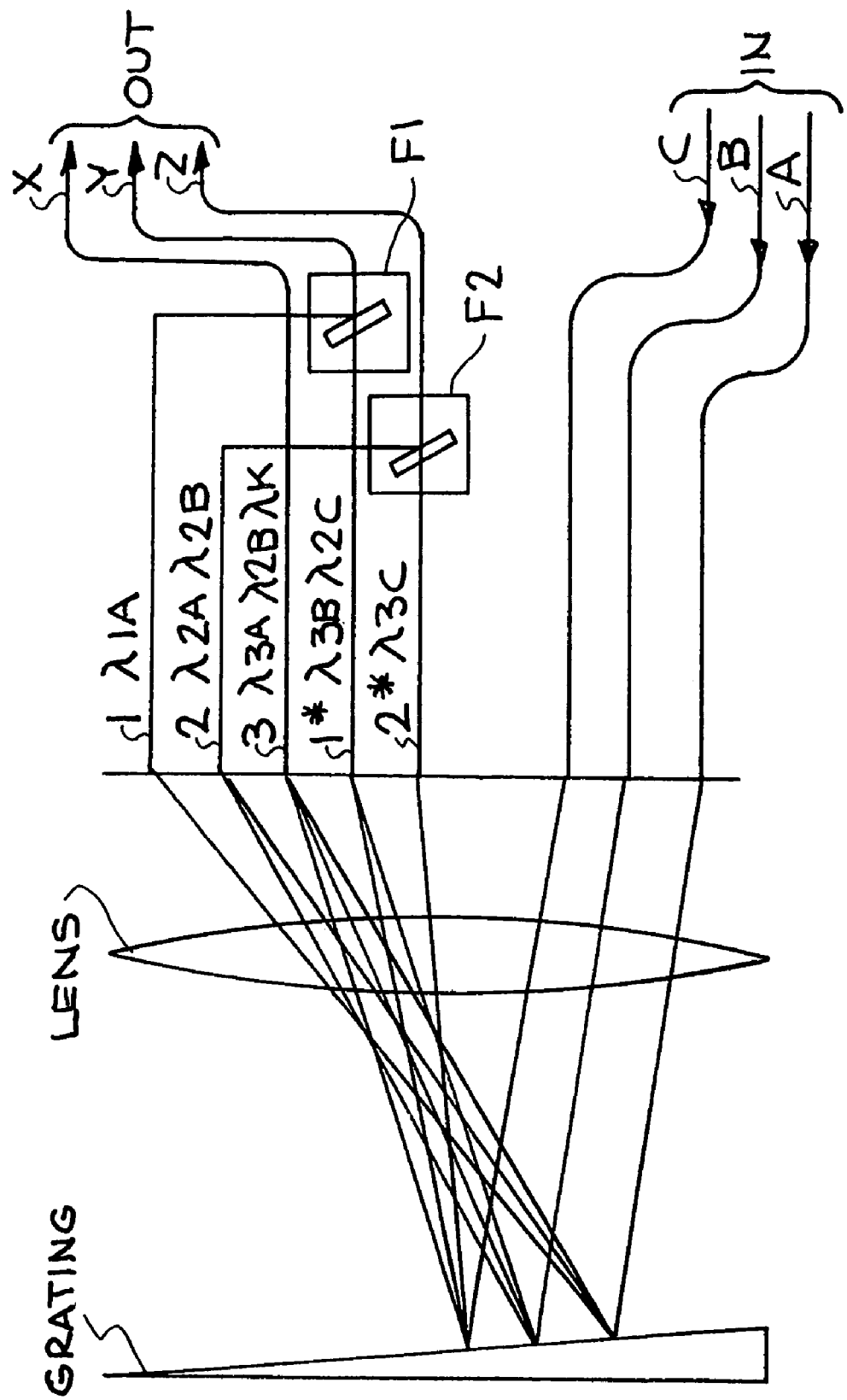
FIG. 4 graphically illustrates an experimental setup of a coarse grating wavelength division multiplexing router that uses wavelength selective (3-port) couplers.

FIG. 4 schematically illustrates the coarse WDM grating router experimental setup. Initial experimental results using 3 inputs and 3 outputs are hereinafter described. In FIG. 4, the inputs A, B, and C are mapped to outputs 1, 2, 3, 1*, and 2*, which are subsequently combined with add/drop filters F1 and F2 to produce the final 3 outputs X, Y, and Z. Wavelength routing was demonstrated using 3 wavelength channels: 827, 864, and 99 nm. Graded index (GRIN) 62.5/125 μm MMF inputs and outputs were terminated in an MT ferrule to provide a fiber to fiber pitch of 250 μm. Three fibers were illuminated with white light from a tungsten lamp. A lens was used to collimate the incident light from the inputs and focus the diffracted light from the grating. Based on the fiber pitch and spectral channel spacing, a linear dispersion of $\Delta x/\Delta \lambda = 250/35 = 7.143$ μm/nm was required in the focal plane of the lens. The linear dispersion of a lens and grating combination used in the Littrow configuration is given by: $\Delta x/\Delta \lambda = 2 \int \tan(\theta)/\lambda$. Where $\int$ is the focal length of the lens, and $\theta$ is the blaze angle of the grating. This equation is valid for wavelengths near the blaze wavelength. The diffraction grating used in this demonstration had a groove density of 400 lines/mm, blaze angle of 9.962 degrees (blaze wavelength=845 nm for Littrow mounting), and was gold coated for high reflectivity. Based on the grating parameters, a lens with a focal length of 16 mm was used to expand and focus the light to and from the fibers. By matching the linear dispersion of the lens and grating combination to the fiber pitch and spectral channel spacing, adjacent spectral channels from a single input are focused to adjacent output fibers. For example, input A, sends $\lambda$=830, 865, and 900 nm to outputs 1, 2, and 3 respectively. Furthermore, by spacing the input fibers with the same pitch as the outputs, adjacent inputs send adjacent spectral channels to the same output. Thus, output 3 receives $\lambda$=900, 865, and 830 nm from inputs A, B, and C respectively. For this device, in general, N inputs produce 2N−1 outputs, one of which has all N wavelengths properly routed and the rest of the outputs forming N−1 pairs of complimentary beams. For example, output 1 only received $\lambda$=830 nm, while output 1* receives $\lambda$=865 and 900 nm. By combining these pairs of complimentary beams, the full routing function is accomplished. Although 2×1 couplers could be used to combine the beam pairs, it is well known that this type of beam combining incurs a 3 dB penalty. In order to circumvent this penalty, we used two add/drop filters F1 and F2 with different passbands to re-combine the two pairs of complimentary output beams. In this application, two inputs are multiplexed onto a single output, one input being reflected by the filter and the other being transmitted through the filter.

Figure 5:
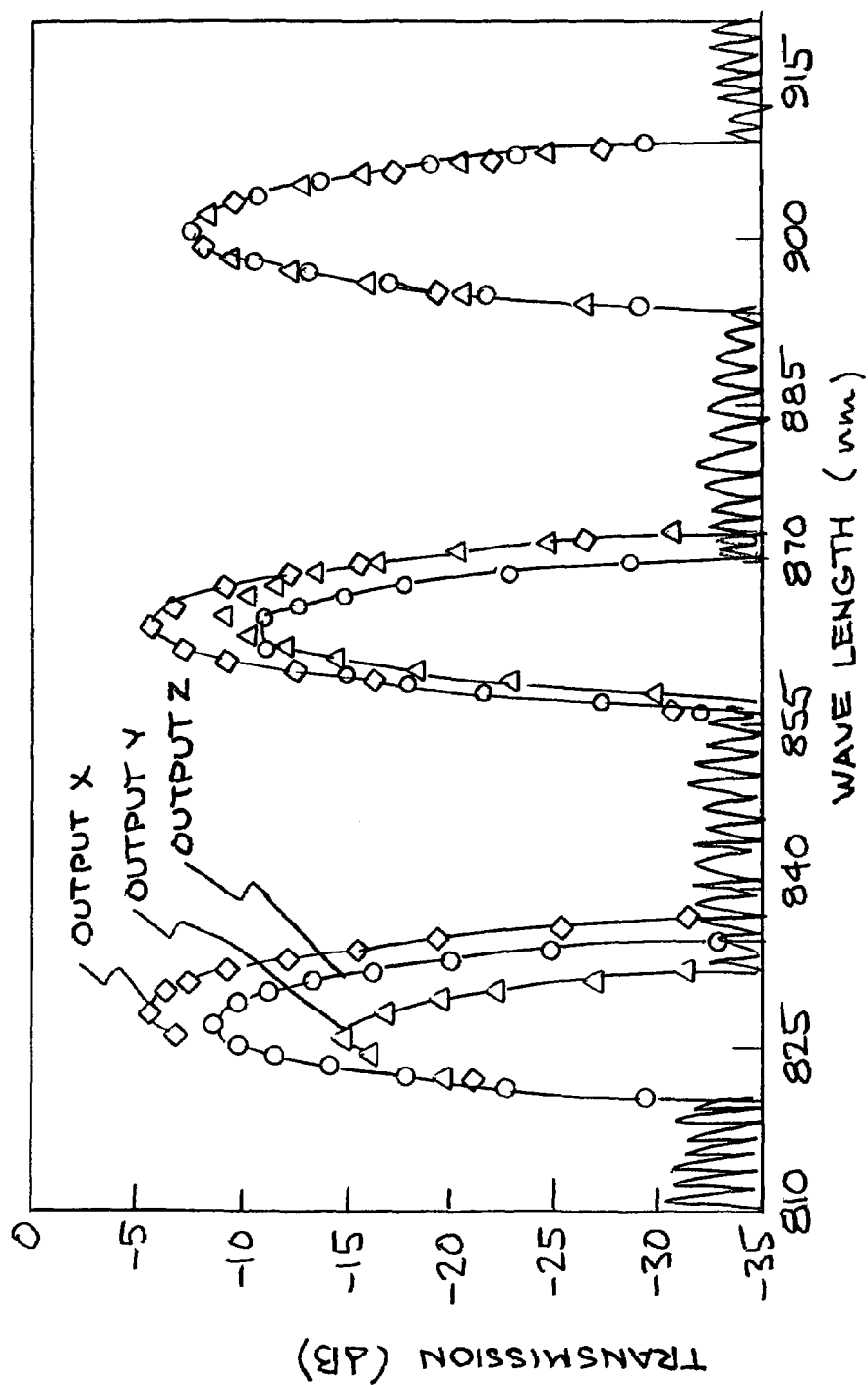
FIG. 5 graphically illustrates the output spectra of the grating router of FIG. 4.

FIG. 5 shows the output spectra from the three outputs (labeled X, Y, and Z in FIG. 4), after beam recombination. Each output channel contains all three spectral channels. Although not apparent from this figure, each spectral channel in each output spectrum originates from a different input fiber. In this initial demonstration the channels had a FWHM of 6 nm. The average insertion loss of the device was 8.7 dB with a standard deviation of 0.81. Optimizing all of the system components will significantly reduce the insertion loss. For example, the add/drop filters were originally developed for another application and exhibit uncharacteristically high insertion losses, up to a maximum of 4.2 db, for the spectral channels of this experiment. These types of filters are reported to exhibit average insertion losses of 1 to 1.5 dB when optimized for the wavelengths of interest. Furthermore, the maximum grating efficiency was 87% (0.6 dB loss). Finally, the maximum insertion loss of 14.7 dB corresponds to the spectral channel that subtends the largest angle from input to output, travelling from input A to output 1 on FIG. 4. This light path experiences very high loss due to vignetting as confirmed by ray tracing. By replacing the lens in the system with a larger diameter 37.5 mm f/1.1 camera lens the problem of vignetting was eliminated, however, the increased focal length resulted in a linear dispersion of 20.8 μm/nm. The new lens supported spectral channel spacings of 12 nm rather than the 37 nm required by the available add/drop filters. Although a full system demonstration was not possible, the average insertion loss of the lens and grating combination was reduced to 5 dB. Ultimately, we believe that a device exhibiting insertion losses of 3 to 4 dB per channel will be attainable.

Thus a multi-mode fiber (MMF) compatible coarse WDM wavelength router has been demonstrated using a diffraction grating and broad-band add/drop filters to achieve wavelength re-use in accordance with the present invention. The scalability of this device to higher channel counts is ultimately limited by the requirements of the lens, the fact that N−1 filter modules are needed to fully route N wavelengths, and the spatial fill factor of the input/output fiber arrays. The device provides a new tool for WDM over MMF. Furthermore, this design enables a bit-parallel wavelength router by using multiple sets of inputs and outputs. Coupled with multi-wavelength transmitter and receiver arrays such a device will provide high throughput, low latency optical interconnects suitable for massively parallel processing applications.

The present invention will find general use as an optical routing fabric for high-capacity communications systems which demand the additional performance afforded by transmitting information using wavelength division multiplexing (whereby the effective bandwidth is multiplied by a factor M, the number of wavelengths) on multimode optical fiber or on parallel optical fiber ribbon cable (whereby this effective bandwidth is multiplied by an additional factor N, the number of fibers in the cable, which is typically ten or more). Particular systems of interest include the interconnects of computing nodes within massively parallel computing dusters, within embedded intelligence applications, and the local area network between such processing systems and user workstations and/or archival storage.

In addition, the present invention provides a means to enhance the bandwidth of optical networks: including local area networks, commercial multiprocessor computing systems such as server dusters, without having to upgrade the physical transmission media. Also useful for future high-speed computer and local area networks (e.g., 10-gigabyte ethernet, two generations beyond the next-generation gigabit ethernet).

Although the experimental demonstration of this invention only involved 3 inputs and 3 outputs, the results are valid for any number of inputs and outputs. Furthermore, it is recognized that the use of concave diffraction gratings could eliminate the need for a separate lens for collimation of the light from the inputs and to the outputs. This may be a cost-reducing factor for production of a device based on this invention. Also, the input and output array can be made more compact by using various technologies such as integrated optic waveguides or polymer based waveguides. The entire device can be made compact and robust by using a monolithic design wherein all of the optical components are fashioned from a single piece of glass or other optically transmissive material. Also, it is noted that although the embodiments illustrate a plurality of couplers or wavelength selective filters being used on the outputs of the diffraction grating, the entire device could be used in reverse, thereby exchanging inputs with outputs.

While particular embodiments, parameters, etc. have been described and or illustrated to exemplify and teach the principles of the invention, such are not intended to be limiting. Modifications and changes may become apparent to those skilled in the art, and it is intended that the invention be limited only by the scope of the appended claims.

The invention claimed is:

1. A wavelength router for fiber optical networking and computer interconnects, comprising:
    at least one diffraction grating operated in a Littrow configuration which utilizes only N wavelengths to interconnect N inputs to N outputs in a fully non-blocking manner, wherein N is any number, and
    a second diffraction grating positioned to receive outputs from said at least one diffraction grating, wherein said at least one diffraction grating and said second diffraction grating are augmented by an optical wavelength add-drop multiplexer.

2. The wavelength router of claim 1, additionally including at least one coupler for combining outputs from said at least one diffraction grating and said second grating.

3. A wavelength router for fiber optical networking and computer interconnects, comprising:
    at least one diffracting grating operated in a Littrow configuration which utilizes only N wavelengths to interconnect N inputs to N outputs in a fully non-blocking manner, wherein N is any number,
    a collection optic assembly positioned to receive outputs from said at least one diffraction grating, and
    a plurality of wavelength selective add/drop filter modules positioned to receive outputs from said collection optic assembly.

4. The wavelength router of claim 3, wherein each of said filter modules include different filters.

5. The wavelength router of claim 3, wherein said plurality of filter modules comprises N−1 different filters for N inputs and N wavelengths.

6. The wavelength router of claim 3, wherein said filter modules are of a 3-port type.

7. A wavelength router for fiber optical networking and computer interconnects, comprising:
    a first diffraction grating,
    a second diffraction grating positioned to receive outputs from said first mentioned diffraction gratings, wherein said first and said second grating operate so as to utilize only N wavelengths to interconnect N inputs to N outputs in a fully non-blocking manner, wherein N is any number,
    at least one collection and re-direction optic assembly positioned to direct inputs to said first and said second diffraction gratings, and
    a retro-reflector assembly positioned to receive predetermined N−1 complimentary outputs from said second diffraction grating and adapted to vertically displace and retro-reflect said predetermined N−1 outputs for redirection by said at least one collection and re-direction optic assembly.

8. The wavelength router of claim 7, wherein said collection and re-direction optic assembly additionally redirects the reflected outputs back through said first and said second diffraction gratings.

9. A wavelength router for fiber optical networking and computer interconnects, comprising:
    at least one diffracting grating operated in a Littrow configuration which utilizes only N wavelengths to interconnect N inputs to N outputs in a fully non-blocking manner, wherein N is any number,
    a collection optic assembly positioned to receive outputs from another diffraction grating, and
    a plurality of filter modules positioned to receive outputs from said collection optic assembly, said filter modules selected from the group consisting of one or more directional couplers and wavelength add-drop multiplexers to provide fully non-blocking interconnection.

* * * * *